United States Patent [19]

Montgomery

[11] Patent Number: 4,629,751
[45] Date of Patent: Dec. 16, 1986

[54] GEL-RESISTANT BUBBLE-FILLED WALL REPAIR COMPOUND

[75] Inventor: Richard L. Montgomery, Woodbury, Minn.

[73] Assignee: Minnesota Mining and Manufacturing Company, St. Paul, Minn.

[21] Appl. No.: 724,460

[22] Filed: Apr. 18, 1985

[51] Int. Cl.$^4$ ............................................. C08J 9/32
[52] U.S. Cl. .................................... 523/219; 106/122; 106/209; 521/54; 521/88
[58] Field of Search ............... 523/219; 521/54, 88; 106/122, 209

[56] References Cited

U.S. PATENT DOCUMENTS

| | | | |
|---|---|---|---|
| 3,030,215 | 4/1962 | Veatch et al. | 106/40 |
| 3,183,107 | 5/1965 | Alford et al. | 106/110 |
| 3,338,848 | 8/1967 | Hamilton | 521/78 |
| 3,365,315 | 1/1968 | Beck et al. | 106/40 |
| 3,386,223 | 6/1968 | Wegwerth | 52/741 |
| 4,005,033 | 1/1977 | Georgeau et al. | 521/54 |
| 4,086,098 | 4/1978 | Le Ruyet et al. | 106/97 |
| 4,309,334 | 1/1982 | Valitsky | 521/54 |
| 4,353,998 | 10/1982 | Gagliani et al. | 521/54 |
| 4,391,646 | 7/1983 | Howell | 106/97 |
| 4,391,647 | 7/1983 | Deer et al. | 106/115 |
| 4,439,381 | 3/1984 | Gagliani et al. | 523/219 |
| 4,485,192 | 11/1984 | Gibbs et al. | 521/54 |

OTHER PUBLICATIONS

J. Am. Chem. Soc. 60, 1045.
J. Am. Chem. Soc. 21, 815.

*Primary Examiner*—Morton Foelak
*Attorney, Agent, or Firm*—Donald M. Sell; James A. Smith; Richard E. Brink

[57] ABSTRACT

Gel-resistant composition especially suited for filling, patching or repairing plaster, gypsum board panels and the like comprising a blend of glass microbubbles containing borate, high molecular weight polyhydroxy compound such as polyvinyl alcohol functioning as a binder, water, and low molecular weight polyhydroxy compound in which at least two of the hydroxyl groups are attached to carbon atoms that are separated by one or more intervening carbon atoms.

13 Claims, No Drawings

GEL-RESISTANT BUBBLE-FILLED WALL REPAIR COMPOUND

BACKGROUND OF THE INVENTION

This invention relates to tape joint compounds, spachtling (or spackling) compounds and similar wall repair compositions and is especially concerned with inexpensive gel-resistant glass bubble-filled compositions of this type.

During installation, plastered surfaces frequently develop cracks, pits, etc. When plaster wallboard is mounted, there are inevitably nail dimples at the location where the individual sheets are nailed to studs or ceiling joists. Perforated tape is commonly applied over the joint between two adjoining gypsum bond panels, joint repair compositions being applied both under and over the tape. Even if the original installation is substantially free of defects, shrinkage or uneven settling is likely to cause cracks at a later time. If pictures are moved from one location to another, nail holes remain at the first location. Flaws of all these types are typically repaired with a joint-filling or spachtling compound, which is a spreadable composition that is applied and allowed to dry or cure. Such compounds typically include polymeric binder, filler, water, water-retention agents, etc.

In recent years, wall repair compositions of the type just discussed have also included a substantial volume of glass microbubbles, reducing the weight of the composition, making it easier to spread smoothly, and providing a surface that is more easily sanded smooth after the composition dries; see, e.g., U.S. Pat. Nos. 3,386,223, 4,086,098, 3,183,107, and 4,391,647.

One method of preparing glass microbubbles is taught in U.S. Pat. No. 3,030,215, which describes the inclusion of a blowing agent in an unfused raw batch of glass-forming oxides. Subsequent heating of the mixture simultaneously fuses the oxides to form glass and triggers the blowing agent to cause expansion. U.S. Pat. No. 3,365,315 describes an improved method of forming glass bubbles in which pre-formed amorphous glass particles are subsequently reheated and converted into glass bubbles. U.S. Pat. No. 4,391,646 discloses that incorporating 1–30 weight percent of $B_2O_3$, or boron trioxide, in glasses used to form microbubbles, as in U.S. Pat. No. 3,365,315, improves strength, fluid properties, and moisture stability. A small amount of sodium borate remains on the surface of these bubbles, causing no problem in most applications. Removal of the sodium borate by washing is possible, but at a significant added expense; even where washing is carried out, however, additional sodium borate leaches out over a period of time.

Because of its ready availability and low cost, polyvinyl alcohol (PVA) is a desirable binder for use in spachtling compounds or other wall repair compositions. Unfortunately, however, when a wall repair composition contains polyvinyl alcohol and borate-containing glass bubbles, the borate reacts with the hydroxyl groups on the polyvinyl alcohol, promptly gelling the composition and rendering it unusable. To a lesser extent, the same problem arises when polyvinyl acetate emulsion, which contains a certain amount of polyvinyl alcohol, is employed as the binder. Guar gum, a naturally occurring high molecular weight polyhydroxy compound, similarly gels in the presence of borate. These and other high molecular weight polyhydroxy compounds may also be used for water retention viscosity control, latex stabilization, etc. Gelation may result in all such cases. Although gelation may be counteracted by acidifying the system, other problems typically result; for example, such common fillers as calcium carbonate dissolve in acidic systems, releasing carbon dioxide and thus causing intolerable bubbling. Prior to the present invention, then, no way of coping with the gelation problem has been recognized.

BRIEF DESCRIPTION OF THE INVENTION

The present invention provides spachtling compounds, wall repair compositions, and the like that utilize polyvinyl alcohol (or other high molecular weight polyhydroxy compounds) as binders, water retention agents, viscosity controllers, latex stabilizers, etc., together with the superior borate-containing glass bubbles, but at the same time does not suffer from the undesirable gelling characteristics of previous such compositions. Further, this composition can be utilized on plaster wallboard that has been rendered fire-retardant by the incorporation of boric acid, without gelling when a spatula or putty knife is repeatedly spread across the wallboard and returned to the container of filler composition.

The present invention thus comprises a gel-resistant composition that is especially suited for patching or repairing plaster, gypsum board panels (including fireproof plaster wallboard) and the like comprising a blend of inorganic fillers, viscosity modifiers, glass microbubbles, high molecular weight compounds such as polyvinyl alcohol, water, and at least one monomeric low molecular weight polyhydroxy compound in which at least two of the hydroxyl groups are attached to carbon atoms that are separated by one or more intervening carbon atoms. Because wall repair compositions are almost always provided in an aqueous carrier, it has been found that the low molecular weight polyhydroxy compound should be at least slightly soluble, i.e., one part should dissolve in 100–1000 parts water or less; cf. Hackh's Chemical Dictionary, Third Edition, McGraw Company, Inc., 1944.

DETAILED DESCRIPTION

In determining the effectiveness of various low molecular weight polyhydroxy compounds to inhibit gelation of compositions containing polyvinyl alcohol and borate-containing glass bubbles, the following method was employed:

A 50-gram aliquot of a 5% aqueous solution of polyvinyl alcohol (100% hydrolyzed, average molecular wight 115,000) is added to a slurry containing 5 grams of glass bubbles (average diameter 60 micrometers, 0.07–0.12 bulk density, containing about 7% $B_2O_3$ by weight, available from 3M Company under the trade designation C15/250), 45 grams of water, and 5 grams of the polyhydroxy compound being evaluated. A control sample, identical except for omission of the polyhydroxy compound, is run concurrently. The control becomes a gelatinous mass, while a composition containing an effective low molecular weight polyhydroxy compound remains fluid.

Five grams of the polyhydroxy compound being evaluated is then added to the gelled control, checking to see whether the control reverts to a fluid state after two or three minutes of mixing with a wooden tongue depressor.

For those polyhydroxy compounds that prove effective in the test outlined above, further tests are performed to determine the minimum amount required to prevent gelation. For those tests in which 5 grams of polyhydroxy compound proves ineffective, additional amounts are added, to a maximum of 30 grams, to see if gelation is prevented.

The following table summarizes results obtained following the process just described:

TABLE I

| Example | Low molecular weight Polyhydroxy Compound | Grams Required to Prevent Gelation |
| --- | --- | --- |
| 1 | glycerol | 8 |
| 2 | 1,3-propane diol | 20 |
| 3 | glyceraldehyde | 1.5 |
| 4 | 1,3-dihydroxy-2-propanone | 3 |
| 5 | glycerol monochlorohydrin | 20 |
| 6 | D-ribose | 1 |
| 7 | L + arabinose | 3 |
| 8 | 1,2-6-trihydroxyhexane | 2 |
| 9 | D + galactose | 7.3 |
| 10 | alpha D-galacturonic acid | 0.3 |
| 11 | D-glucose | 0.8 |
| 12 | glucuronic acid | 0.4 |
| 13 | sorbitol | 0.8 |
| 14 | gluconic acid | 2 |
| 15 | D + mannitol | 1 |
| 16 | mannose | 5 |
| 17 | D-glucose | 0.8 |
| 18 | pentaerythritol | 0.8 |

Lest it be supposed that the three monocarboxylic acids listed above prevent gelation because of their acidity rather than because of their hydroxy groups, it is noted that each has a pH of 7 and that no gelation occurs when NaOH is added to raise the pH.

It should be noted at this point that the reaction between borate ion and hydroxyl compounds has been well documented. Thus, it has long been recognized that borates react with polyvinyl alcohol (see, e.g., J. Am. Chem Soc. 60, 1045), as well as with certain sugars and various other polyhydroxy compounds (see, e.g., J. Am. Chem. Soc., 21, 815). It is believed, however, that no one has heretofore recognized the utility of selectively employing a low molecular weight polyhydroxy compound in a borate-containing environment to prevent an undesirable reaction with a high molecular weight polyhydroxy compound.

EXAMPLE 1

A joint filling composition was prepared from the following components:

|  | Parts by weight | Calculated volume, percent solids basis |
| --- | --- | --- |
| 5% (weight) aqueous solution of polyvinyl alcohol (binder) | 800 | 3.68 |
| Ethylene glycol | 15.0 | 1.38 |
| Preservative ("Nuosept" 95) | 5.5 | 0.51 |
| Attapulgus clay | 18.0 | 0.64 |
| Ground calcium carbonate | 244 | 8.33 |
| Talc | 77.0 | 2.53 |
| Mica powder | 36.0 | 1.45 |
| Thixotrope ("Cellocize" TJC 500) | 5.0 | 0.46 |
| Sorbitol (low MW polyhydroxy compound) | 12.0 | 1.11 |
| Glass bubbles (3M C15/250) | 130 | 79.91 |

The liquid components were first added to a container mounted on a low shear double planetary laboratory mixer, after which the solid components were added gradually as mixing proceeded. Small amounts of water were added to achieve a viscosity (Brookfield RTV, Spindle F, 0.5 RPM, using a heliopath adapter) of approximately 2,000 Pa.s. The composition showed no signs of gelation, even after standing for several days. When applied to gypsum board, the composition adhered well to seam tape, showed little or no signs of sagging or leveling when applied to vertical surfaces, dried at the normal rate, and could be readily sanded after drying.

EXAMPLE 2

Into a beaker was placed 10 grams of the glass bubbles employed in Example 1 and a magnetic stirrer used to agitate the mass. Using an eyedropper, 3.8 grams of a 21% solution of sorbitol in water was slowly added. About half way through the addition, the bubbles began to slump and act much like damp sugar. After the addition had been completed, the damp bubbles were air dried to a constant weight of 10.8 grams, showing that 0.8 gram of sorbitol had been added. When 5 grams of the treated bubbles was added to 45 grams of water and 50 grams of a 5% aqueous solution of polyvinyl alcohol, no gelation was observed. Further experimentation showed that the same results were obtained with only half the amount of sorbitol adhered to the glass bubbles. A control made with identical but untreated glass bubbles gelled almost immediately.

The foregoing Example 2 demonstrates an efficient and convenient way of canceling the normal tendency of borate-containing glass bubbles to gel high molecular weight polyhydroxy compositions, making it simpler for a manufacturer to prepare filler or repair compositions of the type described.

As previously indicated, the polyvinyl alcohol employed in the preceding examples can be replaced by such naturally occurring high molecular weight polyhydroxy binders as guar gum with substantially the same results. Again, omission of the monomeric polyhydroxy compound causes gelation to occur almost immediately.

With appropriate adjustment of the amount, any of the low molecular weight polyhydroxy compounds listed in Table 1 can be incorporated in compositions similar to that of Examples 1 and 2 with substantially the same results. In selecting the specific monomeric polyhydroxy compound, those skilled in the art will take into consideration such factors as amount required, cost, and possible reaction with other components in the final composition.

It should also be recognized that the list of monomeric polyhydroxy compounds listed in Table 1 is not exhaustive, and it is anticipated that those skilled in the art, building on the foregoing disclosure, will readily locate other satisfactory substances.

The two working examples yield compositions intended for joint filling use, requiring some degree of structural strength. Spachtling compounds, which are intended primarily for spot repair, have less stringent requirements and typically include a higher percent of inorganic filler; however, the same principles of preventing gelation still apply.

What is claimed is as follows:

1. Gel-resistant composition especially suited for patching or repairing plaster, gypsum board panels and the like comprising a blend of glass microbubbles formed from a composition that includes trivalent boron, high molecular weight polyhydroxy compound binder, water, and a low molecular weight polyhydoxy compound in which at least two of the hydroxyl groups are attached to carbon atoms that are separated by one or more intervening carbon atoms.

2. The composition of claim 1 wherein the low molecular weight polyhydroxy compound comprises alpha-D-galacturonic acid.

3. The composition of claim 1 wherein the low molecular weight polyhydroxy compound comprises glucuronic acid.

4. The composition of claim 1 wherein the low molecular weight polyhydroxy compound comprises sorbitol.

5. The composition of claim 1 wherein the low molecular weight polyhydroxy compound comprises D-glucose.

6. The composition of claim 1 wherein the low molecular weight polyhydroxy compound comprises D+mannitol.

7. The composition of claim 1 wherein the low molecular weight polyhydroxy compound comprises D-ribose.

8. The composition of claim 1 wherein the low molecular weight polyhydroxy compound comprises glyceraldehyde.

9. The composition of claim 1 wherein the low molecular weight polyhydroxy compound comprises pentaerythritol.

10. The composition of claim 1 wherein the polyhydroxy compound comprises 1,2,6-trihydroxy hexane.

11. The composition of claim 1 wherein the polyhydroxy compound comprises gluconic acid.

12. The composition of claim 1 wherein the polyhydroxy compound comprises mannose.

13. The composition of claim 1 wherein the high molecular weight polyhydroxy compound is polyvinyl alcohol.

* * * * *